(12) United States Patent
Roper et al.

(10) Patent No.: US 10,179,428 B2
(45) Date of Patent: Jan. 15, 2019

(54) MECHANICALLY REINFORCED FOAM INSULATION PANEL AND METHODS OF MAKING THE SAME

(71) Applicant: THE BOEING COMPANY, Chicago, IL (US)

(72) Inventors: Christopher S. Roper, Oak Park, CA (US); David Page, Irvine, CA (US); Randall Schubert, Santa Monica, CA (US); Keith Y. Chong, Huntington Beach, CA (US); Eric Clough, Malibu, CA (US); Angela M. Iler, Huntington Beach, CA (US); Faizal K. Barnes, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/354,725

(22) Filed: Nov. 17, 2016

(65) Prior Publication Data

US 2018/0133936 A1    May 17, 2018

(51) Int. Cl.
*B29C 44/12* (2006.01)
*B29C 44/34* (2006.01)
(Continued)

(52) U.S. Cl.
CPC ...... *B29C 44/1214* (2013.01); *B29C 44/1228* (2013.01); *B29C 44/1266* (2013.01);
(Continued)

(58) Field of Classification Search
CPC ... B29C 44/1214; B29C 44/56; B29C 44/355; B29C 44/1266; F02K 9/605;
(Continued)

(56) References Cited

U.S. PATENT DOCUMENTS

| 2,710,443 A | 5/1950 | Webb |
| 3,435,893 A | 4/1969 | Withers |

(Continued)

FOREIGN PATENT DOCUMENTS

| GB | 2048108 | 12/1980 |
| WO | 2011051106 A1 | 5/2011 |

OTHER PUBLICATIONS

T Kuboki, Foaming behavior of cellulose fiber-reinforced polypropylene, 2013, Journal of Cellular Plastics http://citeseerx.ist.psu.edu/viewdoc/download?doi=10.1.1.1003.6033&rep=rep1&type=pdf (Year: 2016).*

(Continued)

*Primary Examiner* — Babajide A Demuren
(74) *Attorney, Agent, or Firm* — Armstrong Teasdale LLP (57) ABSTRACT

A formation assembly for use in manufacturing a reinforced insulation panel including a foam material and a reinforcing structure includes a back plate including a first surface configured to receive the foam material, and a first support sheet spaced from the first surface to form a gap therebetween, wherein the first support sheet supports the reinforcing structure. The formation assembly also includes a second support sheet spaced from the first support sheet, wherein the second support sheet defines an upper boundary of the reinforced insulation panel. A rigid structure is coupled to the second support sheet, wherein the rigid structure restricts movement of the reinforced insulation panel.

18 Claims, 6 Drawing Sheets

(51) Int. Cl.
*B29C 44/56* (2006.01)
*B65D 81/38* (2006.01)
*F02K 9/60* (2006.01)
*B29L 7/00* (2006.01)
*B29L 31/30* (2006.01)
*B64G 1/40* (2006.01)
*B29K 105/04* (2006.01)
*B29K 25/00* (2006.01)
*B29K 27/06* (2006.01)
*B29K 75/00* (2006.01)

(52) U.S. Cl.
CPC ............ *B29C 44/355* (2013.01); *B29C 44/56* (2013.01); *B65D 81/3816* (2013.01); *F02K 9/605* (2013.01); *B29K 2025/06* (2013.01); *B29K 2027/06* (2013.01); *B29K 2075/00* (2013.01); *B29K 2105/045* (2013.01); *B29K 2105/046* (2013.01); *B29K 2995/0063* (2013.01); *B29L 2007/002* (2013.01); *B29L 2031/3076* (2013.01); *B29L 2031/3097* (2013.01); *B64G 1/402* (2013.01); *F05D 2300/612* (2013.01)

(58) Field of Classification Search
CPC ................ B65D 81/3816; B64G 1/402; B29L 2007/002; B29L 2031/3076; B29L 2031/3097
See application file for complete search history.

(56) References Cited

U.S. PATENT DOCUMENTS

| | | | |
|---|---|---|---|
| 4,125,152 A | 11/1978 | Kestner et al. | |
| 4,683,121 A | 7/1987 | Gourdiaan et al. | |
| 5,401,449 A * | 3/1995 | Hill | B29C 44/569 156/245 |
| 6,644,535 B2 * | 11/2003 | Wallach | B21F 27/128 219/153 |
| 7,190,580 B2 | 3/2007 | Bezama et al. | |
| 7,296,769 B2 * | 11/2007 | Hogenson | B64D 37/06 220/560.15 |
| 7,424,967 B2 * | 9/2008 | Ervin | A47J 36/02 228/181 |
| 7,963,085 B2 * | 6/2011 | Sypeck | B29D 24/00 52/652.1 |
| 8,272,309 B1 * | 9/2012 | Cumberland | F41H 5/0414 89/36.02 |
| 8,320,727 B1 | 11/2012 | Jacobsen et al. | |
| 8,573,289 B1 | 11/2013 | Roper et al. | |
| 8,586,179 B1 | 11/2013 | Jacobsen et al. | |
| 8,663,539 B1 | 3/2014 | Kolodziejska et al. | |
| 9,783,324 B2 * | 10/2017 | Embler | B64G 1/402 |
| 2003/0010483 A1 | 1/2003 | Ikezaki et al. | |
| 2004/0256395 A1 * | 12/2004 | Lak | F17C 3/04 220/560.15 |
| 2006/0101849 A1 | 5/2006 | Taras et al. | |
| 2010/0101978 A1 | 4/2010 | Gordon et al. | |
| 2010/0151189 A1 | 6/2010 | Chakrabarti | |
| 2010/0300669 A1 | 12/2010 | Jacobsen et al. | |
| 2010/0323181 A1 | 12/2010 | Nutt et al. | |
| 2011/0244213 A1 * | 10/2011 | Jones | B29C 44/083 428/304.4 |
| 2013/0143060 A1 | 6/2013 | Jacobsen et al. | |
| 2013/0303067 A1 * | 11/2013 | Doty | B32B 3/12 454/76 |
| 2016/0016521 A1 * | 1/2016 | Maehara | B60R 13/011 428/138 |
| 2016/0046098 A1 * | 2/2016 | Pinney | B32B 7/08 428/116 |
| 2017/0291330 A1 * | 10/2017 | Jeunesse | B29C 37/006 |
| 2017/0320290 A1 * | 11/2017 | Endres | B32B 7/08 |
| 2018/0036922 A1 * | 2/2018 | Walters | B29C 43/36 |

OTHER PUBLICATIONS

U.S. Appl. No. 13/618,616.
U.S. Appl. No. 13/786,367, filed Mar. 5, 2013.
U.S. Appl. No. 14/185,665.
Canadian Office Action, Application No. 2,836,709, dated Feb. 10, 2015, pp. 3.
Canadian Office Action, Application No. 2,836,709, dated Dec. 21, 2015, pp. 3.
European Search Report, Application No. 14157663.7, dated May 20, 2014, pp. 5.
European Search Report, Application No. 14157663.7, dated Oct. 9, 2015, pp. 4.
Extended European Search Report, Application No. 15199572.7, dated May 12, 2016, pp. 7.

* cited by examiner

PRIOR ART

FIG. 7 ced foam.

MECHANICALLY REINFORCED FOAM INSULATION PANEL AND METHODS OF MAKING THE SAME

FIELD

The present disclosure relates generally to an insulation panel for use with cryogenic propellant vessels, and, more specifically, to an insulation panel that includes a mechanically reinforced foam.

BACKGROUND

Aerospace vehicle designs commonly utilize a variety of propellants to supply both launch/takeoff and maneuvering power requirements. The quantity of propellant required for most missions, especially for launch/takeoff requirements, often generates severe design constraints and can require considerable portions of vehicle size to be dedicated towards the vessels carrying the propellant. The use of cryogenic propellants allows the propellants to be maintained in a liquid state rather than in their room temperature gaseous form. This allows a greater quantity of propellant to be stored in a smaller container. This, in turn, improves the design capabilities of aerospace vehicles.

Figure 1:
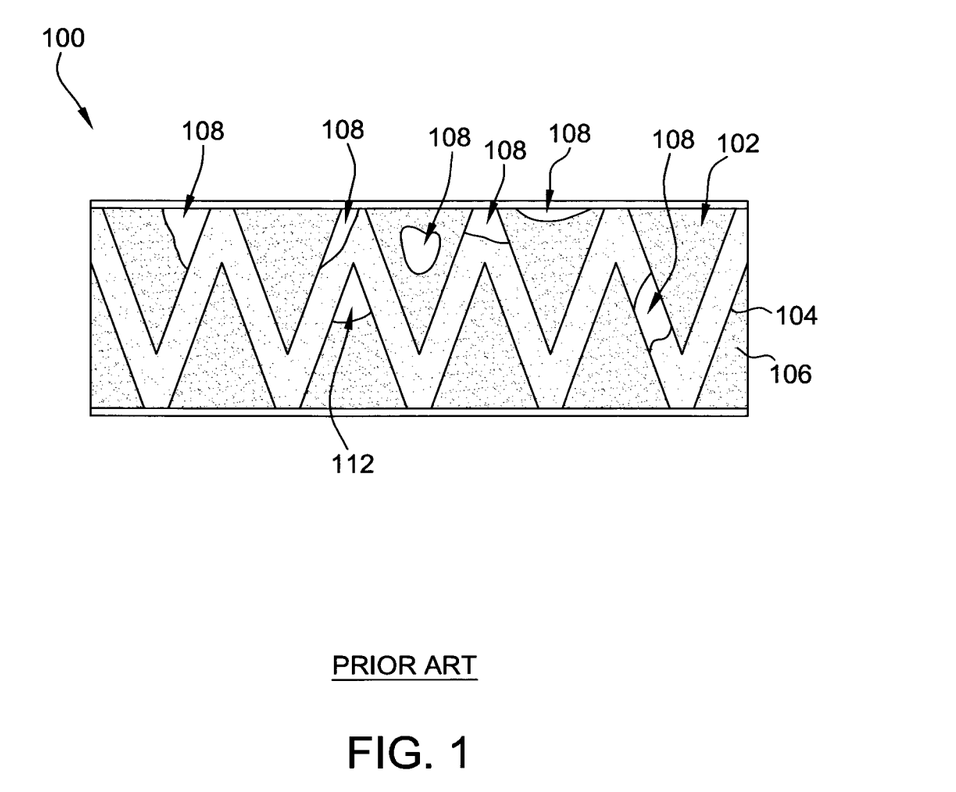
FIG. 1 is a prior at insulation panel.

At least some known cryoinsulation is applied to the exterior of the propellant vessels and can consist of a foam insulation layer. At least some known cryoinsulation includes a reinforcing structure that provides mechanical reinforcement to the foam layer to reduce cracking, delamination, and spalling. Prior art FIG. 1. illustrates a known insulation panel 100 including a cryofoam assembly 102 that includes a reinforcing structure 104 and a foam 106 surrounding reinforcing structure 104. During manufacturing of cryofoam assembly 102, liquid precursors of foam 106 expand around reinforcing structure 104 and within individual members of reinforcing structure 104. In some cases, the expanding foam 106 creates a plurality of voids 108 within hollow structure and/or on the outside of structure 108.

New mechanically reinforced insulation panels and methods for forming such panels would be a welcome addition to the art.

BRIEF DESCRIPTION

In one aspect, a formation assembly for use in manufacturing a reinforced insulation panel including a foam material and a reinforcing structure is provided. The formation assembly includes a back plate including a first surface configured to receive the foam material, and a first support sheet spaced from the first surface to form a gap therebetween, wherein the first support sheet supports the reinforcing structure. The formation assembly also includes a second support sheet spaced from the first support sheet, wherein the second support sheet defines an upper boundary of the reinforced insulation panel. A rigid structure is coupled to the second support sheet, wherein the rigid structure restricts movement of the reinforced insulation panel.

In another aspect, reinforced insulation panel is provided. The reinforced insulation panel includes a foam material and a reinforcing structure encased within the foam material such that the foam material continuously contacts the reinforcing structure, wherein the foam material is substantially void-free.

In yet another aspect, a method of manufacturing reinforced insulation panel using a formation assembly is provided. The method includes positioning a reinforcing structure between a second support sheet and a first support sheet, wherein the second and first support sheets include a plurality of through-holes. A back plate is positioned below the first support sheet to define a gap therebetween. The method also includes positioning a rigid structure above the second support sheet to restrict movement of the reinforcing structure, wherein the rigid structure includes a plurality of through-holes. The method also includes depositing foam precursors on the back plate into the gap and allowing the foam precursors to expand through the pluralities of through-holes in the first support sheet, the second support sheet, and the rigid structure, such that the reinforced insulation panel includes the reinforcing structure encased in substantially void-free foam material.

The features, functions, and advantages that have been discussed can be achieved independently in various examples of the present disclosure or may be combined in yet other examples further details of which can be seen with reference to the following description and drawings.

DETAILED DESCRIPTION

The described examples may be utilized as part of an insulation panel for an aerospace vehicle and are directed to an insulation panel that includes a stochastic foam material and a reinforcing structure encased within the foam material such that the foam material continuously contacts the reinforcing structure and the foam material is substantially void-free. Also described herein is a formation assembly for use in manufacturing the insulation panel. The formation assembly includes a back plate including a first surface configured to receive the foam material, a first support sheet spaced from the first surface to form a gap therebetween, and a second support sheet spaced from the first support sheet such that the insulation panel is formed between the sheets. The formation assembly also includes a rigid structure coupled to the second support sheet and configured to restrict movement of the reinforced insulation panel. The formation assembly suspends the reinforcing structure such that the foam material is allowed to expand through the reinforcing structure and the formation assembly to reduce or prevent voids or air pockets within the foam material. Moreover, the insulation panel having a reinforcing structure encased in void-free expanded foam material provides a higher insulation thermal resistance and prevents cryopumping better than known insulation assemblies.

Accordingly, the present disclosure provides for a cryofoam insulation assembly that satisfies the strength and reusability requirements associated with multi-mission flight environments. Furthermore, the present disclosure provides for a cryofoam insulation that is substantially void-free within and outside of its reinforcing assembly, and thus satisfies additional high quality application requirements.

As used herein, the term "aerospace vehicle" may include, but is not limited to, airplanes, unmanned aerial vehicles (UAVs), gliders, helicopters, spacecraft, reusable launch vehicles, and/or any other object that travels through airspace.

Figure 2:
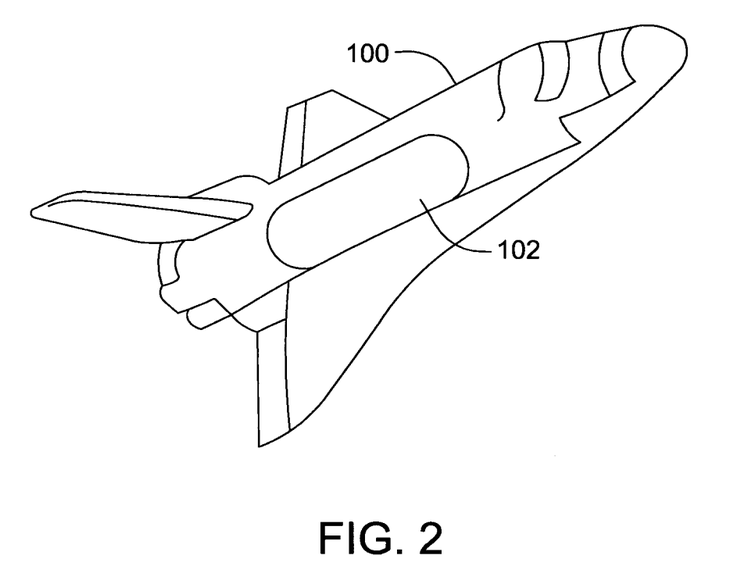
FIG. 2 is an illustration of an exemplary aerospace vehicle including an exemplary cryogenic propellant vessel assembly.

FIG. 2 illustrates an exemplary aerospace vehicle 200 having at least one cryogenic propellant vessel 202 in accordance with the present disclosure. In one implementation vehicle 200 is a reusable launch vehicle for use in space oriented missions. In another suitable implementation, vehicle 200 is a vehicle used in intra-atmosphere flights, such as a hydrogen powered passenger aircraft. Generally, it should be understood that cryogenic propellant vessel 202 can be utilized in a wide variety of aerospace vehicles 200 and the vehicle shown is for illustrative purposes only. Furthermore, vehicle 200 may include more than the single cryogenic propellant vessel 202 shown in FIG. 2. It should be understood, however that the number and orientation of cryogenic propellant vessel 202 within vehicle 200 are contemplated to be application specific.

Figure 3:
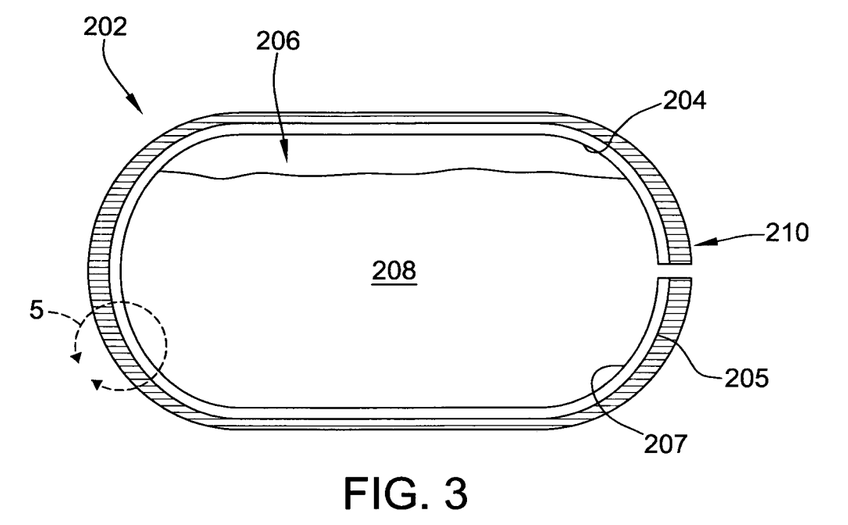
FIG. 3 is a cross-sectional illustration of the cryogenic propellant vessel illustrated in FIG. 2, illustrating an exemplary insulation panel coupled to an exterior surface of the cryogenic propellant vessel.
Figure 4:
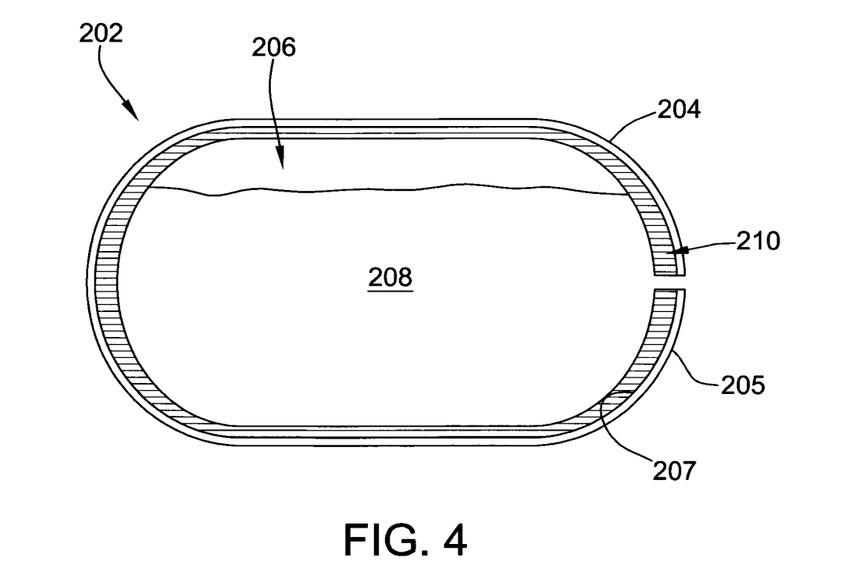
FIG. 4 is a cross-sectional illustration of an alternative cryogenic propellant vessel assembly illustrating the insulation panel shown in FIG. 3 coupled to an interior surface of the cryogenic propellant vessel.

FIG. 3 is a cross-sectional illustration of cryogenic propellant vessel 202. In the above implementation, cryogenic propellant vessel 202 includes a vessel wall 204 that defines an inner volume 206 configured to house a supply of cryogenic propellant 208. The supply of cryogenic propellant 208 should be thermally protected such that cryogenic propellant 208 is kept within a temperature range suitable to prevent boil-off or phase change. As used herein, the term "cryogenic" or "cryo-" is used to refer to any substance in liquid phase that boils at or below about −160° C. (−256° F.) when under standard atmospheric pressure. Non-limiting examples of cryogenic propellants that maybe be contained within cryogenic propellant vessel 202 include oxygen, nitrogen, hydrogen, helium, and combinations thereof. Disclosed herein is a unique approach to maintaining cryogenic propellant 208 at such a temperature range through the use of a reinforced insulation panel 210 coupled to vessel wall 204 of cryogenic propellant vessel 202. In one implementation, as shown in FIG. 3, reinforced insulation panel 210 is coupled to a first surface 205 of vessel wall 204. Alternatively, as shown in FIG. 4 reinforced insulation panel 210 is coupled to a second surface 207 of vessel wall 204. Additionally, reinforced insulation panel 210 may be coupled to both first and second surfaces 205 and 207 of propellant vessel wall 204. Furthermore, reinforced insulation panel 210 may be coupled to first surface 205 in some regions of vessel wall 204 and to second surface 207 in other regions of vessel wall 204.

Figure 5:
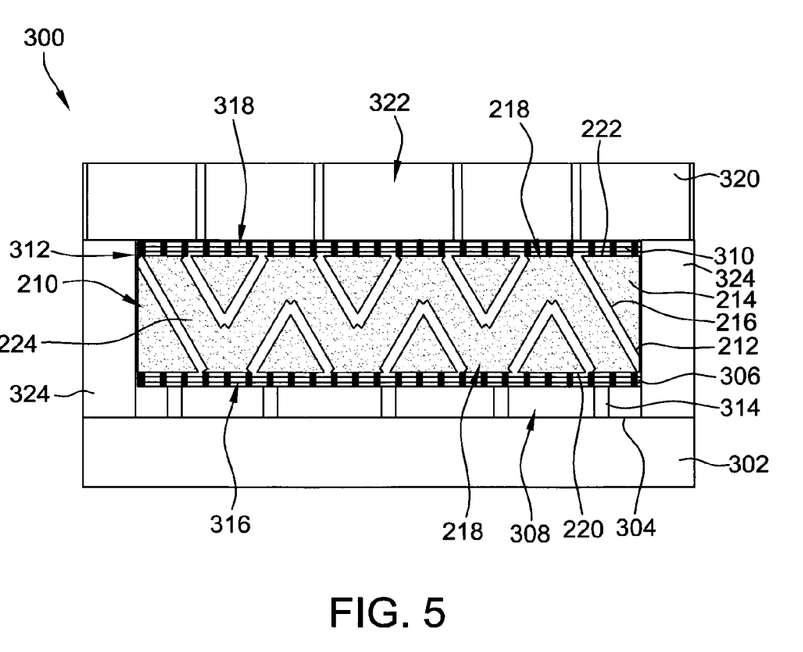
FIG. 5 is a cross-sectional illustration of an exemplary formation assembly that may be used to form the insulation panel shown in FIGS. 3 and 4.

FIG. 5 is a cross-sectional illustration of reinforced insulation panel 210 and a formation assembly 300 used to manufacture reinforced insulation panel 210. In the above implementation, reinforced insulation panel 210 includes a reinforcing structure 212 encased within a stochastic foam material 214. As used herein, the term "stochastic" describes a foam whose porosity distribution is random, irregular, or both rand and irregular and is formed by foaming of liquid or solid (powder) metal, vapor deposition, or direct or indirect random casting of a mold. Stochastic foam is generally faster and easier to manufacture than foam with a regular porosity distribution in addition to being less expensive. As described in further detail herein, reinforcing structure 212 is encased within foam material 214 such that foam material 214 continuously contacts reinforcing structure 212 and foam material 214 is substantially void-free. Furthermore, although reinforced insulation panel 210 is shown in FIG. 5 as a substantially flat member, reinforced insulation panel 210 may be curved such that reinforced insulation panel 210 defines at least one radius of curvature when it is desired that reinforced insulation panel 210 be curved such as shown in the curves of cryogenic propellant vessel 202 in FIGS. 3 and 4.

Figure 7:
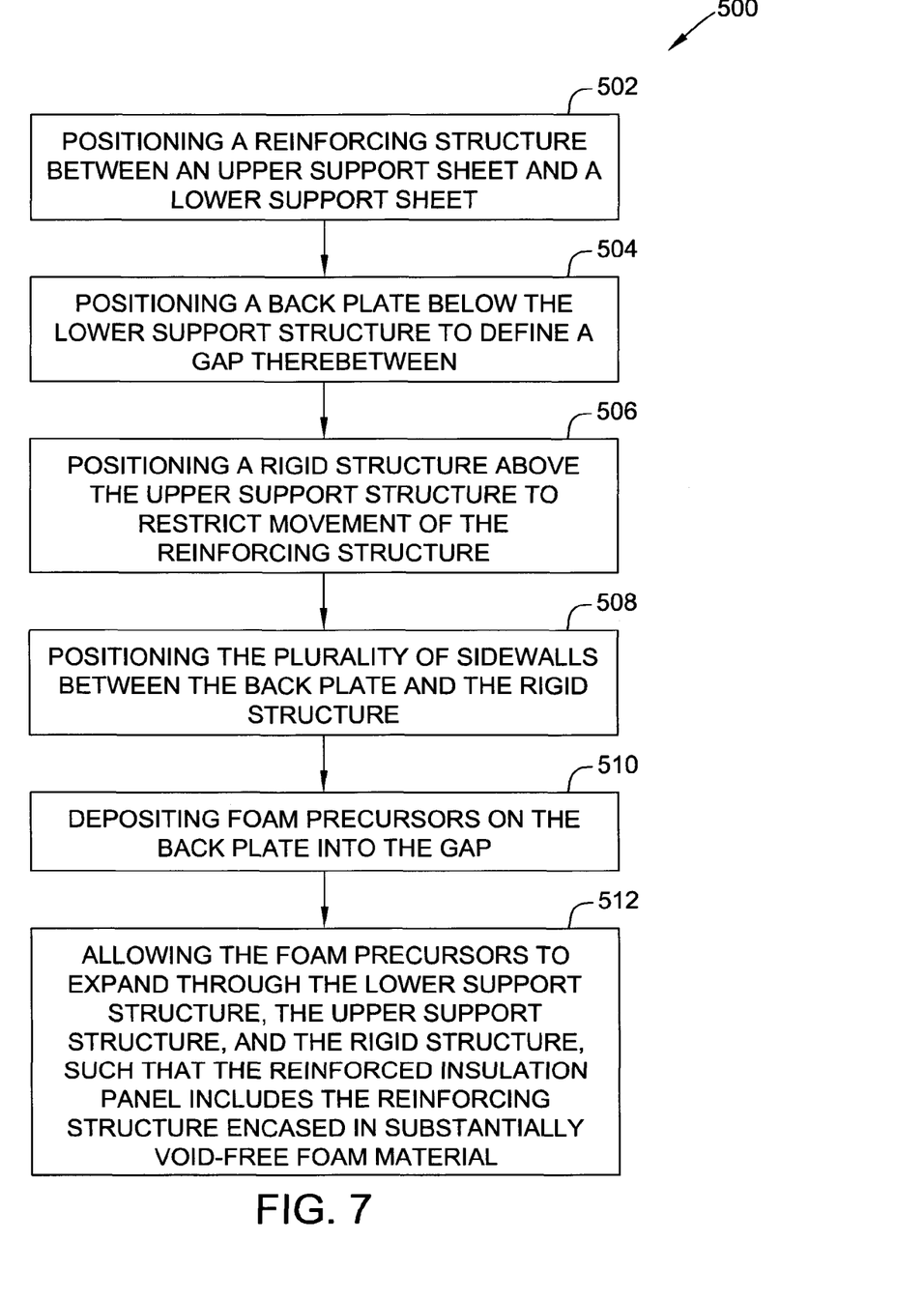
FIG. 7 is a flow diagram of an exemplary method of manufacturing the insulation panel shown in FIG. 5.

In the above implementation, foam material 214 may be either open cell or closed cell and is made from a material such as, but not limited to, polyurethane, polyisocyanurate, polystyrene, polyimide, polyvinyl chloride, silicone, or any combination thereof. Reinforcing structure 212 is a physical material that provides a structural core to which foam material 214 adheres and may be utilized to broaden the range of foam materials that can be utilized by reinforced insulation panel 210 by removing or reducing strength requirements from foam material 214 because reinforcing structure 212 provides strength to foam material 214 itself. In the above implementation, reinforcing structure 212 includes one of a truss structure (as shown in FIG. 7) or a honeycomb structure. Furthermore, reinforcing structure 212 is formed from at least one of a foam material and a metallic material.

Figure 6:
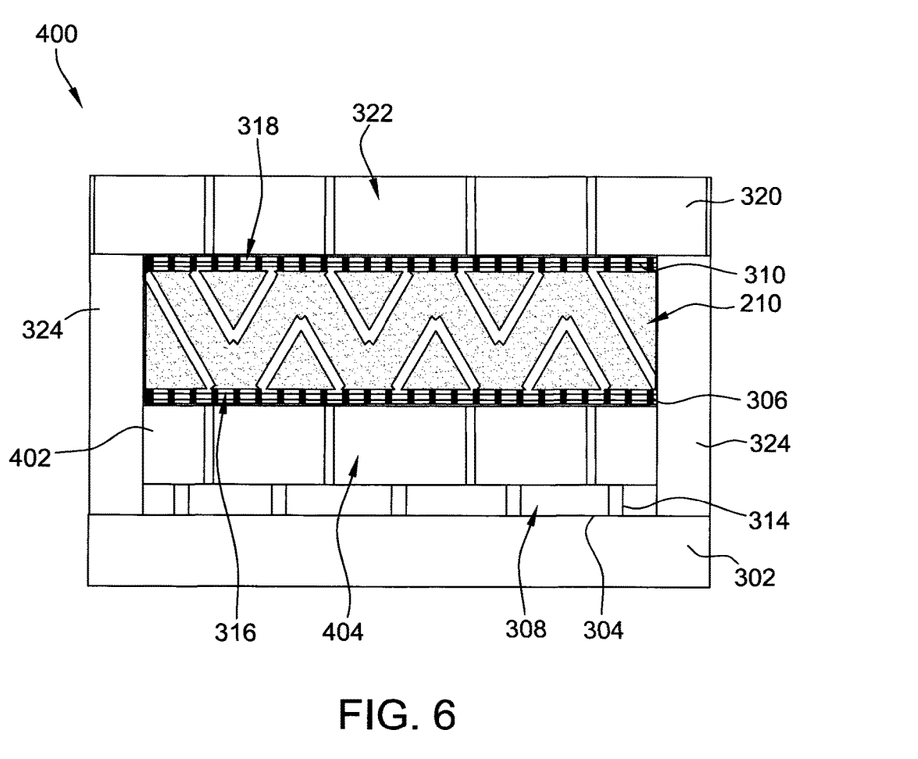
FIG. 6 is a cross-sectional illustration of an alternative formation assembly that may be used to form the insulation panel shown in FIGS. 3 and 4.

As shown in FIG. 5, reinforcing structure 212 includes a plurality of truss members 216 that intersect each other at corresponding ends to define a node 218. In the above implementation, nodes 218 are positioned only proximate a lower surface 220 and an upper surface 222 of reinforced insulation panel 210 such that reinforcing structure 212 is comprised of repetitions of half a unit cell. As used herein, the term "unit cell" is meant to describe the smallest group truss members 216 and nodes 218 from which the entire reinforcing structure 212 can be built up by repetition in three dimensions. Alternatively, reinforcing structure 212 may include a plurality of nodes 218 between lower and upper surfaces 220 and 222 such that reinforcing structure 212 defines as many unit cells as necessary to facilitate operation of reinforced insulation panel 210 as described herein. Although reinforcing structure 212 is shown in FIGS. 5 and 6 and described herein as a plurality of truss members 216, in other examples, reinforcing structure 212 includes a honeycomb structure including a plurality of honeycomb-shaped cells.

As shown in FIG. 7, in the above implementation, truss members 216 are thin-walled hollow structures such that foam material 214 not only extends between individual truss members 216, but also is channeled within an interior 224 of each truss member 216. In one implementation, foam material 214 between truss members 216 and within hollow truss members 216 is the same material. In another implementation, reinforced insulation panel 210 achieves a higher strength per weight when a denser, stronger foam material is filled inside hollow truss members 216 and a less dense foam material is filled around and between truss members 216. For example, hollow truss members 216 are filled with a first foam material having a first density, and the area around hollow truss members 216 is filled with a second foam material having a second density that is less than the first density of the first foam material within hollow truss members 216. The greater the density of the foam materials, the greater the strength of reinforced insulation panel 210, but also the greater the weight. As such, the densities of the foam materials are chosen to achieve a desired strength at a desired weight.

Hollow truss members 216 are generally preferred over solid truss members because reinforcing structure 212 having hollow truss members 216 is generally a lighter weight than having solid truss members. Furthermore, for truss structures of equivalent mass and unit cell dimensions, reinforcing structure 212 will have shorter maximum distances from truss members 216 to any point in foam material 214 than having solid truss members. Hollow truss members 216, having less mass, also decrease the thermal conductance of reinforcing structure 212. However, in implementations where mechanical loads are of greater concern than overall weight of reinforced insulation panel 210, then reinforcing structure 212 having solid truss members may be preferred.

In one example, hollow truss members 216 have a diameter that is within a range of between approximately 1.0 millimeter (mm) (0.039 inches (in.)) and approximately 12.0 mm (0.472 in.). More specifically, hollow truss members 216 have a diameter that is within a range of between approximately 3.0 mm (0.118 in.) and approximately 8.0 mm (0.315). Alternatively, truss members 216 may have any diameter that facilitates operation of reinforced insulation panel 210 as described herein. Furthermore, the density of truss members 216 in reinforcing structure 212 is within a range of between approximately 0.10 pound per cubic foot (lb./ft.$^3$) (1.60 kilograms per cubic meter (kg/m$^3$)) and approximately 1.0 lb./ft.$^3$ (16.01 kg/m3). More specifically, the density of truss members 216 in reinforcing structure 212 is within a range of between approximately 0.30 lb./ft.$^3$ (4.81 kg/m$^3$) and approximately 0.8 lb./ft.$^3$ (12.81 kg/m3) to achieve a desired strength and weight of reinforced insulation panel 210. Alternatively, reinforcing structure 212 may have any density that facilitates operation of reinforced insulation panel 210 as described herein. Additionally, reinforced insulation panel 210 includes a thickness within a range of between approximately 12.7 mm (0.5 in.) and approximately 50.8 mm (2.0 in.). More specifically, reinforced insulation panel 210 includes a thickness within a range of between approximately 20 mm (0.79 in.) and approximately 35 mm (1.38 in.) to achieve a desired strength and weight of reinforced insulation panel 210. Alternatively, reinforced insulation panel 210 may have any thickness that facilitates operation of reinforced insulation panel 210 as described herein.

In the above implementation, reinforcing structure 212 is fabricated from at least one of a ceramic material, a metal, a metal alloy, a polymer material, or any combination thereof. One implementation of reinforced insulation panel 210 utilizes a polymer material, and more specifically, a parylene polymer material to fabricate reinforcing structure 212. Polymer is a preferred material because of its relatively low thermal conductivity rate compared to ceramics and metals.

FIG. 5 also illustrates formation assembly 300 for use in manufacturing reinforced insulation panel 210. Formation assembly 300 includes a back plate 302 including a first surface 304 configured to receive foam material 214 in the form of an expanding liquid precursor, a first support sheet 306 spaced from first surface 304 to define a gap 308 therebetween, and a second support sheet 310 spaced from first support sheet 306. In the above implementation, reinforcing structure 212 is positioned between support sheets 306 and 310 such that first support sheet 306 supports reinforcing structure 212 and second support sheet 310 defines an upper boundary 312 of reinforced insulation panel 210.

First surface 304 of back plate 302 is a continuous surface that receives foam material 214 as a liquid precursor, which flows laterally to self-level on first surface 304 and then expands upwards through first support sheet 306, reinforcing structure 212, and second support sheet 310, as described herein, to form expanded foam material 214. In one implementation, back plate 302 is formed from a foam material, such as, but not limited to, polyurethane foam or expanded polystyrene foam. Such a configuration provides for a sacrificial, or single-use, back plate 302 that can be removed via sanding to reveal reinforced insulation panel 210. In another implementation, back plate 302 is formed from wood, a polymer material, or a metallic material, such as aluminum. Such a configuration provides for a reusable back plate 302 that is detached from foam material 214 to reveal reinforced insulation panel 210. Generally, back plate 302 is formed from any rigid material that facilitates expansion of foam material 214 as described herein. Furthermore, although shown in FIG. 5 as substantially planar in shape, back plate 302 may be formed into any shape that corresponds to a desired final shape of reinforced insulation panel 210. For example, in one implementation, back plate 302 includes at least one radius of curvature. Alternatively, back plate 302 is a substantially flat plate as shown in FIG. 5.

Formation assembly 300 also includes a plurality of spacers 314 coupled to first surface 304 and configured to support first support sheet 306 such that gap 308 is maintained between first surface 304 and first support sheet 306. As such, spacers 314 define gap 308 below first support sheet 306 to accommodate uniform delivery of foam material 214 to enable leveling of the liquid foam precursors before foaming occurs. Gap 308 further allows foaming to begin before encountering any structure to prevent trapping air in or near reinforcing structure 212 such that foam material 214 expands homogenously and contains no large air pockets such that foam material 214 is substantially void-free. More specifically, after expansion, foam material 214 includes a pore size of approximately 0.2 millimeters (mm) to approximately 0.5 mm. Additionally, foam material 214 includes a maximum pore size of approximately 0.5 mm. More specifically, foam material 214 includes a maximum pore size of approximately 0.3 mm.

In the above implementation, first support sheet 306 includes a first plurality of through-holes 316 and second support sheet 310 includes a second plurality of through-holes 318. Through-holes 316 and 318 enable foam material 214 to expand through support sheets 306 and 310 without trapping any air within foam material 214 such that reinforcing structure 212 is encased in foam material 214 that is substantially free of air pockets, or voids. In the above implementation, first and second support sheets 306 and 310 are substantially similar to each other and are formed from a woven metal mesh that defines through-holes 316 and 318. In another implementation, first and second support sheets 306 and 310 are formed from an expanded metal screen, expanded metal mesh, or a perforated plate that defines through-holes 316 and 318. Generally, first and second support sheets 306 and 310 are formed form any material with any configuration having an open porosity that enables foam material 214 to expand through first and second support sheets 306 and 310 without forming voids in foam material 214. More specifically, through-holes 316 and 318 include a diameter smaller than the critical dimension of reinforcing structure 212. For example, through-holes 316 and 318 include a diameter smaller than a truss member diameter for a truss reinforcing structure 212. This is to prevent portions of reinforcing structure 212 from rising with foam material 214 into through holes 318 as foam material 214 expands.

As discussed herein, reinforcing structure 212 is a lightweight structure. As such, reinforcing structure 212 may be moved and deformed by expansion of foam material 214 as it rises up through first support sheet 306. Furthermore, first and second support sheets 306 and 310 are formed from lightweight materials and are also subject to deformation by expansion of foam material 214. Accordingly, reinforcing structure 212 is held in place by second support sheet 310 and by a rigid structure 320 coupled to second support sheet 310. In the above implementation, rigid structure 320 is positioned above reinforcing structure 212 and restricts upward movement of reinforcing structure 212 caused by the expanding foam material 214. Rigid structure 320 is especially beneficial when foaming large insulation panels 210 requiring volumes of foam material 214 that can create very large forces which could deform flexible support sheets 306 and 310. Although shown in FIG. 7 as a substantially flat member, rigid structure 320 may be curved such that rigid structure 320 defines at least one radius of curvature. More specifically, rigid structure 320 is shaped to correspond to a final desired shape of reinforced insulation panel 210 since rigid structure 320 controls the deformation of support sheet 310 and of reinforcing structure 212.

In the above implementation, rigid structure 320 is formed from a foam material, such as, but not limited to, polyurethane foam or expanded polystyrene foam such that rigid structure 320 is sacrificial and can be removed by sanding, grinding, or dissolving. In another implementation, rigid structure 320 is formed from a metallic material or a plastic material such that rigid structure 320 is able to be retrieved and reused. Rigid structure 320 includes a plurality of through-holes 322 that enable foam material to expand therethrough after foam material 214 has already expanded through first support sheet 306, reinforcing structure 212, and second support sheet 310 such that reinforcing structure 212 is encased in substantially void-free foam material 214. In one implementation, through-holes 322 are formed by a grid-like or wine-crate like configuration of rigid structure 320 members. In another implementation, through-holes 322 are formed by a honeycomb configuration of rigid structure 320 members.

Formation assembly 300 also includes a plurality of sidewalls 324 that define the lateral boundaries of reinforced insulation panel 210. Sidewalls 324 are coupled between back plate 302 and rigid structure 320 to provide support to rigid structure 320. In one implementation, sidewalls 324 also support at least one of first and second support sheets 306 and 310. In the above implementation, sidewalls 324 are formed from a foam material, such as, but not limited to, polyurethane foam or expanded polystyrene foam such that sidewalls 324 are sacrificial and can be removed by sanding, grinding, or dissolving. In another implementation, sidewalls 324 are formed from a metallic material or a plastic material such that sidewalls 324 are able to be retrieved and reused.

FIG. 6 is a cross-sectional illustration of an alternative formation assembly 400 that may be used to form reinforced insulation panel 210. Formation assembly 400 is substantially similar to formation assembly 300 (shown in FIG. 5) in operation and composition, with the exception that formation assembly 400 includes a second rigid structure 402 positioned between first support sheet 306 and back plate 302. As such, components shown in FIG. 6 are labeled with the same reference numbers used in FIG. 5.

As shown in FIG. 6, second rigid structure 402 is coupled to first support sheet 306 and is spaced from back plate 302 such that gap 308 is defined between back plate surface 304 and second rigid structure 402. Although shown in FIG. 6 as a substantially flat member, rigid structure 402 may be curved such that rigid structure 402 defines at least one radius of curvature. More specifically, rigid structure 402 is shaped to correspond to a final desired shape of reinforced insulation panel 210 since rigid structures 320 and 402 control the deformation of support sheets 306 and 310 and of reinforcing structure 212.

In the above implementation, rigid structure 402 is formed from a foam material, such as, but not limited to, polyurethane foam or expanded polystyrene foam such that rigid structure 402 is sacrificial and can be removed by sanding, grinding, or dissolving. In another implementation, rigid structure 402 is formed from a metallic material or a plastic material such that rigid structure 402 is able to be retrieved and reused. Rigid structure 402 includes a plurality of through-holes 404 that enable foam material to expand therethrough before foam material 214 expands through first support sheet 306, reinforcing structure 212, second support sheet 310, and rigid structure 320 such that reinforcing structure 212 is encased in substantially void-free expanded foam material 214. In one implementation, through-holes 404 are formed by a grid-like or wine-crate like configuration of rigid structure 402 members. In another implementation, through-holes 404 are formed by a honeycomb configuration of rigid structure 402 members.

FIG. 7 is a flow diagram of an exemplary method 500 of manufacturing the insulation panel shown in FIG. 5. Method 500 includes positioning 502 reinforcing structure 212 between second support sheet 310 and first support sheet 306. As described above second and first support sheets 310 and 306 include a plurality of through-holes 316 and 318. Method 500 also includes positioning 504 back plate 302 below first support sheet 306 to define gap 308 therebetween. In one example, positioning 504 back plate 302 below first support sheet 306 is completed prior to positioning 502 reinforcing structure 212 between second support sheet 310 and first support sheet 306. Rigid structure 320 is then positioned 506 above second support sheet 310 to restrict movement of reinforcing structure 212. Furthermore, rigid structure 320 includes the plurality of through-holes 322. Positioning 506 rigid structure 320 includes coupling rigid structure 320 to second support sheet 310 to secure second support sheet 310.

In the above implementation, method 500 also includes positioning 508 the plurality of sidewalls 324 between back plate 302 and rigid structure 320 to limit lateral expansion of foam material 214 depositing 510 foam precursors on back plate 302 into gap 308. The foam precursors are then allowed 512 to expand through the pluralities of through-holes 316, 318, and 322 in first support sheet 306, second support sheet 310, and rigid structure 320, such that reinforced insulation panel 210 includes reinforcing structure 212 encased in substantially void-free foam material 214.

Additionally, in one implementation, method 500 also includes coupling first support sheet 306 to second rigid structure 402 spaced above back plate 302 to define gap 308 between back plate 302 and second rigid structure 402.

Once foam material 214 has completed the expansion process, reinforced insulation panel 210 needs to be harvested from the extraneous foam material 214 surrounding it and also from formation assembly 300. Accordingly, method 500 includes removing rigid structure 320 from foam material 214. In one implementation, rigid structure 320 is formed from a foam material and is sacrificial such that rigid structure 320 is removed from foam material 214 by simultaneously grinding or sanding rigid structure 320 and the foam material 214 within through-holes 322. In configurations including second rigid structure 402, second rigid structure 402 is removed in a substantially similar way.

Rigid structures 320 and 402 are sanded until second and first support sheets 310 and 306 are exposed. As such, support sheets 306 and 310 form the upper and lower boundaries of reinforced insulation panel 210 and reinforced insulation panel 210 requires removal from between support sheets 306 and 310. Because, in the above implementation, support sheets 306 and 310 are made from a metallic material, support sheets 306 are peeled away from reinforced insulation panel 210 to reveal the completed panel 210.

In one application, the described examples may be utilized as part of an insulation panel for an aerospace vehicle. The described examples are directed to an insulation panel that is a stochastic foam material and a reinforcing structure encased within the foam material such that the foam material continuously contacts the reinforcing structure and the foam material is substantially void-free. Also described herein is a formation assembly for use in manufacturing the insulation panel. The formation assembly includes a back plate including a surface configured to receive the foam material, a first support sheet spaced from the surface to form a gap therebetween, and a second support sheet spaced from the first support sheet such that the insulation panel is formed between the sheets. The formation assembly also includes a rigid structure coupled to the second support sheet and configured to restrict movement of the reinforced insulation panel. The formation assembly suspends the reinforcing structure between the support sheets such that the foam material is allowed to expand through the reinforcing structure and the formation assembly to minimize, reduce, or prevent voids or air pockets within the foam material. Moreover, the insulation panel having a reinforcing structure encased in voidless foam provides more resistance to mechanical and thermal stresses (less spalling and less delamination) than known insulation assemblies.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A formation assembly for use in manufacturing a reinforced insulation panel including a foam material and a reinforcing structure, said formation assembly comprising:
    a back plate comprising a first surface configured to receive the foam material;
    a first support sheet spaced from said first surface to form a gap therebetween, wherein said first support sheet supports the reinforcing structure;
    a plurality of spacers coupled between said first surface and said first support sheet to define said gap;
    a second support sheet spaced from said first support sheet, wherein said second support sheet defines an upper boundary of the reinforced insulation panel; and
    a rigid structure coupled to said second support sheet, wherein said rigid structure restricts movement of the reinforced insulation panel.

2. The formation assembly in accordance with claim 1, wherein said first support sheet and said second support sheet are configured to be deformed by expansion of the foam material.

3. The formation assembly in accordance with claim 1, wherein said first support sheet and said second support sheet are formed from one of a woven metal mesh, a perforated plate, or an expanded metal mesh.

4. The formation assembly in accordance with claim 1, wherein said rigid structure is formed from at least one of a foam material and a metallic material.

5. The formation assembly in accordance with claim 1, further comprising a plurality of sidewalls configured to support at least one of said rigid structure and said second support sheet.

6. The formation assembly in accordance with claim 1, further comprising a second rigid structure coupled to said first support sheet and spaced from said first surface to define said gap between said first surface and said second rigid structure.

7. The formation assembly in accordance with claim 1 wherein said first support sheet comprises a first plurality of through-holes, said second support sheet comprises a second plurality of through-holes, and said rigid structure comprises a third plurality of through-holes, wherein the foam material expands through said first, second, and third pluralities of through-holes such that the reinforcing structure is encased in substantially void-free foam material.

8. A method of manufacturing a reinforced insulation panel using a formation assembly, said method comprising:
    positioning a reinforcing structure between a second support sheet and a first support sheet, wherein the second and first support sheets include a plurality of through-holes;
    positioning a back plate below the first support sheet to define a gap therebetween;
    positioning a plurality of spacers between the back plate and the first support sheet to define the gap;
    positioning a rigid structure above the second support sheet to restrict movement of the reinforcing structure, the rigid structure including a plurality of through-holes;
    depositing foam precursors on the back plate into the gap; and
    allowing the foam precursors to expand through the pluralities of through-holes in the first support sheet, the second support sheet, and the rigid structure, such that the reinforced insulation panel includes the reinforcing structure encased in substantially void-free expanded foam material.

9. The method in accordance with claim 8, further comprising removing the rigid structure from the expanded foam material.

10. The method in accordance with claim 9, wherein removing the rigid structure includes simultaneously grinding a portion of the expanded foam material and the rigid structure.

11. The method in accordance with claim 8, further comprising coupling the first support sheet to a second rigid structure spaced above the back plate to define the gap between the back plate and the second rigid structure.

12. The method in accordance with claim 8, further comprising coupling the second support sheet to the rigid structure to secure the second support sheet.

13. The method in accordance with claim 8 further comprising positioning a plurality of sidewalls between the back plate and the rigid structure to limit expansion of the foam material.

14. The method in accordance with claim 8 further comprising removing the insulation panel from between the second and the first support sheets.

15. A formation assembly for use in manufacturing a reinforced insulation panel including a foam material and a reinforcing structure, said formation assembly comprising:
- a back plate comprising a first surface configured to receive the foam material;
- a first support sheet spaced from said first surface to form a gap therebetween, wherein said first support sheet supports the reinforcing structure;
- a second support sheet spaced from said first support sheet, wherein said second support sheet defines an upper boundary of the reinforced insulation panel;
- a first rigid structure coupled to said second support sheet, wherein said rigid structure restricts movement of the reinforced insulation panel; and
- a second rigid structure coupled to said first support sheet and spaced from said first surface to define said gap between said first surface and said second rigid structure.

16. A formation assembly for use in manufacturing a reinforced insulation panel including a foam material and a reinforcing structure, said formation assembly comprising:
- a back plate comprising a first surface configured to receive the foam material;
- a first support sheet spaced from said first surface to form a gap therebetween, wherein said first support sheet supports the reinforcing structure, said first support sheet comprising a first plurality of through-holes;
- a second support sheet spaced from said first support sheet, wherein said second support sheet defines an upper boundary of the reinforced insulation panel, said second support sheet comprising a second plurality of through-holes; and
- a rigid structure coupled to said second support sheet, wherein said rigid structure restricts movement of the reinforced insulation panel, said rigid structure comprising a third plurality of through-holes, wherein the foam material expands through said first, second, and third pluralities of through-holes such that the reinforcing structure is encased in substantially void-free foam material.

17. A method of manufacturing a reinforced insulation panel using a formation assembly, said method comprising:
- positioning a reinforcing structure between a second support sheet and a first support sheet, wherein the second and first support sheets include a plurality of through-holes;
- positioning a back plate below the first support sheet to define a gap therebetween;
- positioning a rigid structure above the second support sheet to restrict movement of the reinforcing structure, the rigid structure including a plurality of through-holes;
- positioning a second rigid structure below the first support sheet and spaced from the back plate to define the gap between the back plate and the second rigid structure;
- depositing foam precursors on the back plate into the gap; and
- allowing the foam precursors to expand through the pluralities of through-holes in the first support sheet, the second support sheet, and the rigid structure, such that the reinforced insulation panel includes the reinforcing structure encased in substantially void-free expanded foam material.

18. A method of manufacturing a reinforced insulation panel using a formation assembly, said method comprising:
- positioning a reinforcing structure between a first support sheet and a second support sheet, wherein the first support sheet includes a first plurality of through-holes and the second support sheet includes a second plurality of through-holes;
- positioning a back plate below the first support sheet to define a gap therebetween;
- positioning a rigid structure above the second support sheet to restrict movement of the reinforcing structure, the rigid structure including a third plurality of through-holes;
- depositing foam precursors on the back plate into the gap; and
- allowing the foam precursors to expand through the first, second, and third pluralities of through-holes in the first support sheet, the second support sheet, and the rigid structure, such that the reinforced insulation panel includes the reinforcing structure encased in substantially void-free expanded foam material.

* * * * *